(12) United States Patent
Zimmermann (10) Patent No.: US 8,813,379 B2
(45) Date of Patent: Aug. 26, 2014

(54) SELF-LEVELING MULTI-LINE LASER DEVICE

(75) Inventor: Thomas Zimmermann, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 13/260,449

(22) PCT Filed: Feb. 2, 2010

(86) PCT No.: PCT/EP2010/051213
§ 371 (c)(1),
(2), (4) Date: Dec. 23, 2011

(87) PCT Pub. No.: WO2010/108718
PCT Pub. Date: Sep. 30, 2010

(65) Prior Publication Data
US 2012/0090184 A1    Apr. 19, 2012

(30) Foreign Application Priority Data

Mar. 26, 2009 (DE) .......................... 10 2009 001 878

(51) Int. Cl.
*G01C 15/00* (2006.01)
*G01B 11/26* (2006.01)
(52) U.S. Cl.
USPC ................................. 33/281; 33/286; 33/291
(58) Field of Classification Search
USPC ............ 33/281, 282, 283, 285, 286, 290, 291
See application file for complete search history.

(56) References Cited

U.S. PATENT DOCUMENTS

| 4,111,564 A | 9/1978 | Trice, Jr. |
| 4,206,550 A * | 6/1980 | Boyett et al. ..................... 33/286 |
| 4,836,669 A | 6/1989 | Teach |
| 5,459,932 A | 10/1995 | Rando et al. |
| 5,539,990 A | 7/1996 | Le |
| 5,572,797 A | 11/1996 | Chase |
| 6,542,304 B2 * | 4/2003 | Tacklind et al. .............. 359/618 |
| 6,892,463 B1 | 5/2005 | Pu |
| 7,328,516 B2 * | 2/2008 | Nash et al. ....................... 33/286 |
| 7,497,018 B2 * | 3/2009 | Hersey et al. ..................... 33/286 |
| 8,281,495 B2 * | 10/2012 | Hayes et al. .................... 33/280 |
| 8,307,562 B2 * | 11/2012 | Bascom et al. .................. 33/286 |
| 2003/0000094 A1 * | 1/2003 | Tamamura ..................... 33/286 |

(Continued)

FOREIGN PATENT DOCUMENTS

| EP | 0 488 046 | 6/1992 |
| EP | 1 328 045 | 7/2003 |

(Continued)

OTHER PUBLICATIONS

International Search Report corresponding to PCT Application No. PCT/EP2010/051213, mailed Nov. 5, 2010 (German and English language document) (7 pages).

*Primary Examiner* — Christopher Fulton
(74) *Attorney, Agent, or Firm* — Maginot, Moore & Beck (57) ABSTRACT

A self-leveling multi-line laser device is disclosed. The multi-line laser device includes at least two laser beams and at least two reflecting cones, wherein the cone axes of the reflecting cones are perpendicular to each other and each of the laser beams can be directed, preferably eccentrically, parallel to the axis of one of the reflecting cones against the tip of said reflecting cone. With the multi-line laser device, at least two projectable laser lines can be generated.

19 Claims, 6 Drawing Sheets

(56) References Cited

U.S. PATENT DOCUMENTS

| | | | |
|---|---|---|---|
| 2003/0159299 A1* | 8/2003 | Goodrich | 33/286 |
| 2003/0229996 A1* | 12/2003 | Tamamura | 33/286 |
| 2004/0085646 A1 | 5/2004 | Tacklind et al. | |
| 2004/0172836 A1* | 9/2004 | Ng et al. | 33/286 |
| 2004/0177523 A1* | 9/2004 | Chang et al. | 33/281 |
| 2005/0091859 A1* | 5/2005 | Pu | 33/281 |
| 2013/0160310 A1* | 6/2013 | Dang | 33/286 |

FOREIGN PATENT DOCUMENTS

| | | |
|---|---|---|
| EP | 1 469 282 | 10/2004 |
| EP | 1 569 282 | 8/2005 |
| WO | 95/06231 A1 | 3/1995 |
| WO | 2007/140323 A2 | 12/2007 |

* cited by examiner

SELF-LEVELING MULTI-LINE LASER DEVICE

This application is a 35 U.S.C. §371 National Stage Application of PCT/EP2010/051213, filed Feb. 2, 2010, which claims the benefit of priority to Application Serial No. DE 10 2009 001 878.6, filed on Mar. 26, 2009 in Germany, the disclosures of which are incorporated herein by reference in their entirety.

BACKGROUND

The disclosure relates to a self-leveling multi-line laser device for generating at least two, mutually perpendicular projectable laser lines. By means of such a device, by way of example, horizontal and vertical planes can be spanned by respective one-dimensionally expanded laser beams and horizontal and vertical lines can respectively be projected for example onto wall areas or objects. These projectable lines are designated henceforth as laser lines or projected laser lines of the multi-line laser device, although the device cannot produce these lines itself, but rather only by projection of the expanded laser beam onto a wall or an object, for example.

Multi-line laser devices of this type can be used, in particular, in industry, in the craft sector and do-it-yourself sector for example for adjustment, marking, measurement and alignment tasks.

Diverse two-line laser devices are known from the prior art, which can be used to project two mutually perpendicular laser lines. In this case, either laser beams are expanded by lens elements in a plane, as a result of which a respective laser line with a useable angular range of approximately 60° to 120° can be generated. Two of these laser lines can thus be provided by combination of two laser beams and two lens elements in a 90° position with respect to one another.

A disadvantage of such two-line laser devices comprising a lens element for expanding the laser beam is, inter alia, the restricted useable angular range of the expanded laser beam of typically 60° to 120°, as a result of which only one laser cross with a single point of intersection between the two projected laser lines can be generated, and a further disadvantage is the great decrease in brightness of the laser line that can be generated toward the outer regions.

Alternatively, rotational laser devices are also commercially available, wherein a laser beam is deflected by 90° by a rapidly rotating deflection element and the optical illusion of a continuous laser line is thus generated by the laser beam rotating with the rotating deflection element. By combining two rotational laser units arranged at an angle of 90° in one device, it is thus possible to project two mutually perpendicular laser lines onto walls or objects, for example.

Disadvantages of such rotational laser devices include, inter alia, the complex mechanical construction and the high production costs associated therewith, and also the large, heavy design of such laser devices. Further disadvantages of such devices include energy consumption and wear and also the limited reliability of said devices over the lifetime.

It is an object of the present disclosure to overcome the disadvantages of the prior art and, in particular, to provide a self-leveling multi-line laser device which can project laser lines over a large angular range of at least 180° in conjunction with a small design, favorable production costs and without rotating parts.

This object is achieved by the self-leveling multi-line laser device set forth below.

Preferred embodiments are also set forth below.

The disclosure specifies a self-leveling multi-line laser device comprising at least two laser beams and at least two reflective cones, wherein the cone axes of the reflective cones are perpendicular to one another and each of the laser beams can be directed—preferably excentrically—parallel to the axis of one of the reflective cones against the vertex of said reflective cone, as a result of which at least two projectable laser lines can be generated.

One advantage of the disclosure consists in the possibility of providing, for example, two mutually perpendicular laser lines having high positional accuracy, which have better visibility in conjunction with a relatively uniform brightness distribution over this large angular range with the emitted laser energy being utilized as completely as possible. Moreover, it is possible as a further advantage, on account of the large angular coverage of the laser line of at least 180°, to produce two points of intersection (or marking crosses) of the projectable laser lines in a "180° position" with respect to one another for example on walls lying opposite one another. A further advantage of the construction according to the disclosure is that the laser energy is distributed effectively substantially only over the desired angular range—and not over 360° as in the case of the rotational lasers used hitherto in said angular range. Moreover, the construction according to the disclosure allows the particularly advantageous use of laser beam sources having non-round beam cross sections, such as, for example, of the particularly economical, reliable and cost-effective laser diodes, wherein a very uniform brightness distribution of the laser lines that can be generated can be obtained in this case. By virtue of the construction according to the disclosure, the complex, expensive and heavy rotational laser devices can be replaced in many applications.

In one preferred embodiment of the disclosure, the reflective cones can have at least partial areas of a lateral surface of a right circular cone having a cone aperture angle of 90°. It is thereby possible to ensure that a parallel-directed laser beam that is incident parallel to the cone axis of the cone partial area is expanded exactly in a plane. The use of such cone partial areas instead of a complete cone makes it possible to save material and structural space.

In a further preferred embodiment of the disclosure, at least one of the reflective cones can have non-reflective partial areas. Thus, it may be desired, for example, for a sector of the cone to be blackened, matted or not reflectively coated, in order thus to limit the laser line that can be generated in the angular range for example to 180° or 200° or 240° or some other value and to prevent "spurious light" and undesired reflections.

In a further preferred embodiment of the disclosure, it is possible that at least one laser beam can be generated by a laser diode as laser beam source and can preferably be collimated by at least one collimating optical element, in particular a collimator lens. The use of laser diodes as laser beam sources allows particularly cost-effective production and also a more compact design of the multi-line laser device. In this case, by means of the collimating optical element, the divergent laser beam as emitted by laser diodes can be collimated, that is to say directed parallel, as a result of which a more exact projection geometry and hence a more exact laser line can be obtained using a right circular cone.

Figure 4:
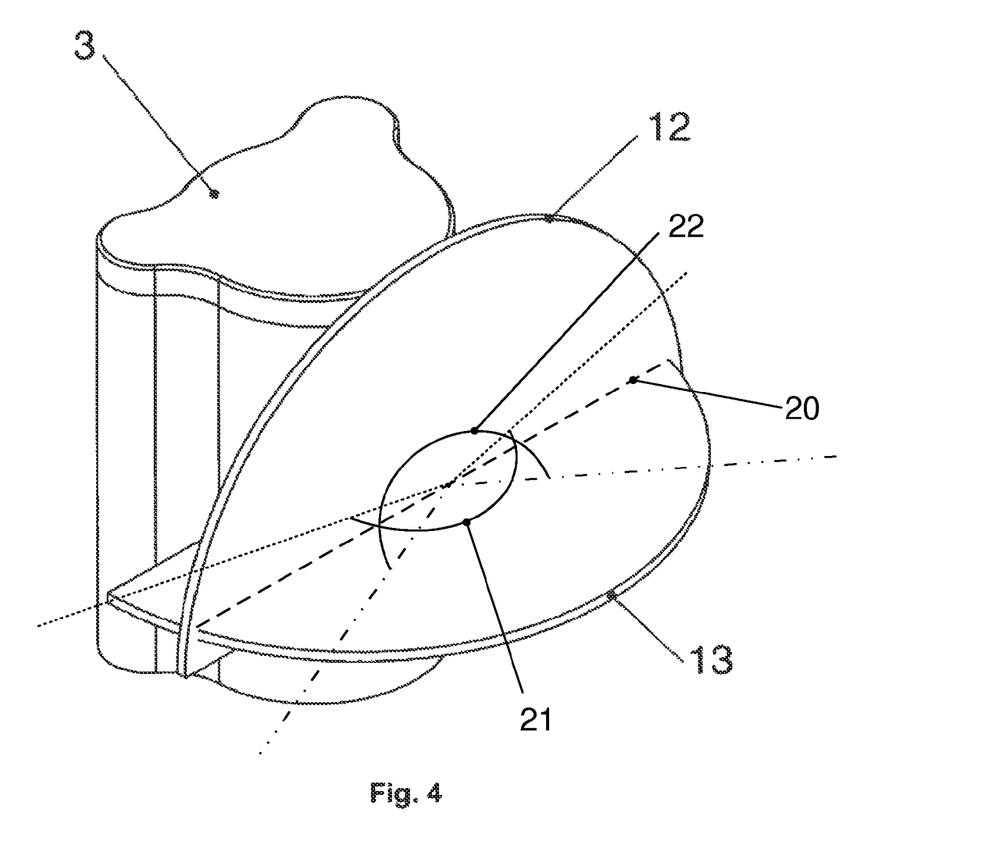
FIG. 4 shows an oblique of the self-leveling multi-line laser device—incorporated into a housing—of the embodiment in FIG. 1 with illustrated laser light planes.

In a further preferred embodiment of the disclosure, it is possible that a laser beam having an elliptical beam cross section can be generated by the laser diode, wherein the center axis of the elliptical beam cross section has a parallel offset relative to the cone axis and is spaced apart from the cone axis in the direction of the short semiaxes of the elliptical beam cross section and, preferably, the distance between the center axis of the elliptical beam cross section and the cone axis is less than or equal to, in particular less than, the length of the short semiaxes of the elliptical beam cross section. It is thereby possible to obtain a particularly high brightness and uniform brightness distribution over an angular range of more than 180°. In a further preferred embodiment of the disclosure, a diaphragm can also be arranged in the beam path of the laser diode. It is thereby possible to balance the brightness distribution of the projectable laser line and to avoid "spurious light" that could pass through the reflective cone without being reflected. In a further preferred embodiment of the disclosure, it is possible that at least two laser beams can preferably be coupled out from a laser beam source, preferably from a laser diode, by means of beam splitting by a partly reflective optical element. This can be achieved in the simplest case by means of a partly transmissive mirror arranged at an angle of 45° with respect to the laser beam to be split. Alternatively, for example partially reflectively coated elements, prisms or intermittently operating, for example mechanical or electro-optical elements could be employed for beam splitting. It is thereby possible to save a laser beam source. This is advantageous particularly if, for example, a green laser line is intended to be provided by the multi-line laser device, since laser beam sources that emit in the green spectral range currently are still relatively expensive. In a further preferred embodiment of the disclosure, the useable angular range of the laser line emitted from the reflective cone is at least 180° (see angle 20 of FIG. 4), preferably greater than 200°, in particular greater than 200° in the horizontal plane (see angle 21 of Figure and greater than 240° in the vertical plane (see angle 22 of FIG. 4). It is thereby possible to provide laser lines which cover more than a semicircle and intersect at two points, in which case areas of application can additionally be opened up. By way of example, in the case of an angular range of more than 240° in the vertical plane in numerous applications including when the multi-line laser device is mounted on a stand, it is possible to provide a usually complete plumb line on a wall, said plumb line extending from the ceiling to the floor.

In a further preferred embodiment of the disclosure, it is possible that an optical system carrier, on and/or in which the laser beam source(s), the collimating optical element(s) and the reflective cones can be mounted, is alignable—preferably self-aligning—in a gravitational field, as a result of which the laser beams and cone axes are alignable in the direction of the gravitational vector or perpendicularly thereto. Such a construction makes it possible to provide horizontal and vertical laser lines particularly expediently and exactly.

In a further preferred embodiment of the disclosure, the self-leveling multi-line laser device can have a third reflective cone or a third device for laser beam expansion, in particular a cylindrical lens or a diffractive optical element (DOE) for generating a further, preferably vertical, laser line, preferably perpendicular to the two other laser lines. It is thus conceivable, for example, by means of extension by a third laser beam and third reflective cone, to generate a third laser line, which spans a third spatial plane and is perpendicular to the two other laser lines. Furthermore, it is particularly advantageously possible to expand a laser beam by means of a cylindrical lens or a diffractive optical element (DOE) in a third spatial plane and thus to generate a third laser line perpendicular to the two other laser lines, wherein such an embodiment can be realized in a particularly space-saving and cost-effective manner.

In a further preferred embodiment of the disclosure, it is possible that the laser beam source(s), the collimating optical element(s) and the reflective cones can be mounted on and/or in an optical system carrier, wherein the optical system carrier is embodied in self-leveling fashion and is preferably suspended in oscillating fashion on preferably two mutually perpendicular bearing axes aligned substantially horizontally in an operating state. A self-leveling capability of the multi-line laser device can thereby be achieved in a particularly advantageous manner.

In a further preferred embodiment of the disclosure, the optical system carrier can have a vibration damping arrangement, preferably a magnetic damping arrangement, in particular an eddy-current damping arrangement. Such a vibration damping arrangement makes it possible to considerably improve the settling duration and the achievable setting accuracy of the laser lines, and thereby to increase practical benefits and efficiency during use in practice.

BRIEF DESCRIPTION OF THE DRAWINGS

With reference to the drawings, the disclosure is explained thoroughly below by way of example on the basis of an exemplary embodiment. The description, the associated figures and the claims contain numerous features in combination. A person skilled in the art will also consider these features, in particular also the features of different exemplary embodiments, individually and combine them to form expedient further combinations.

In the figures.

DETAILED DESCRIPTION

Figure 1:
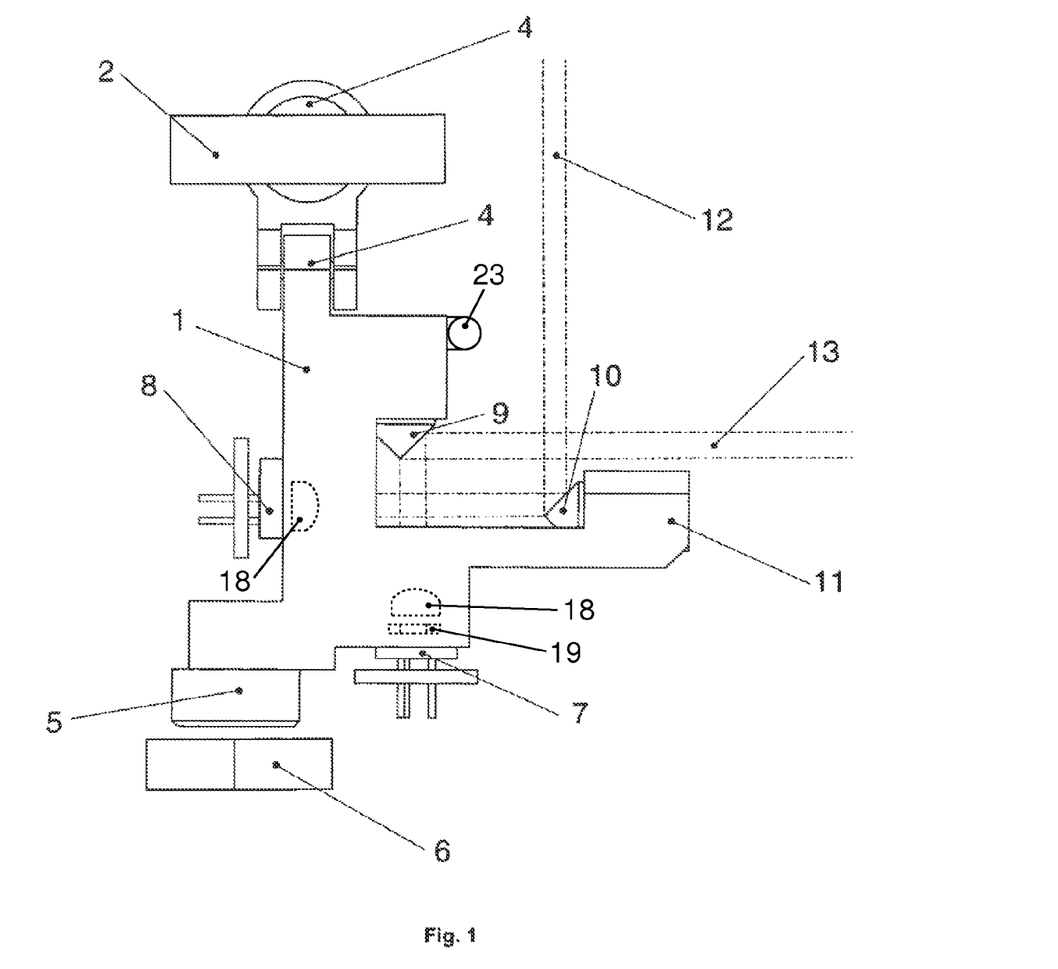
FIG. 1 shows a side view of the optical system carrier of one embodiment of the self-leveling multi-line laser device with incorporated laser modules (comprising, inter alia, laser diode and collimator lenses) and projection cones (reflective cones), and also with cardanic suspension and an eddy-current damping arrangement.
Figure 2:
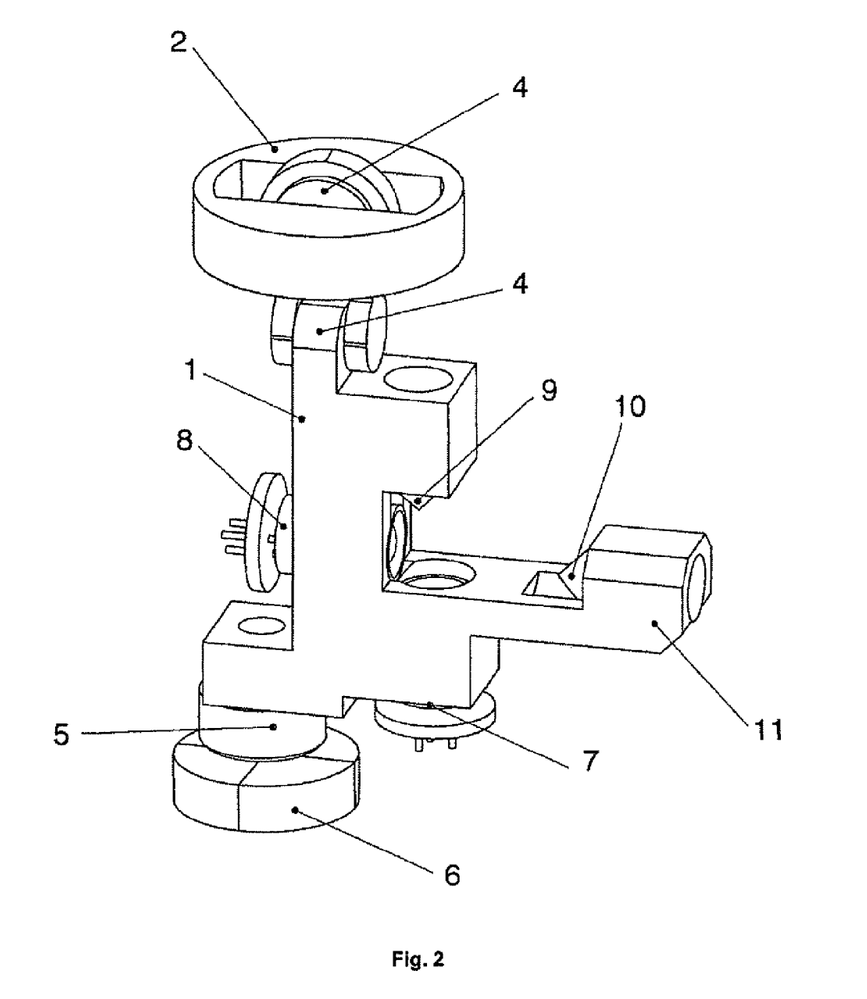
FIG. 2 shows a perspective view of the article in FIG. 1.
Figure 3:
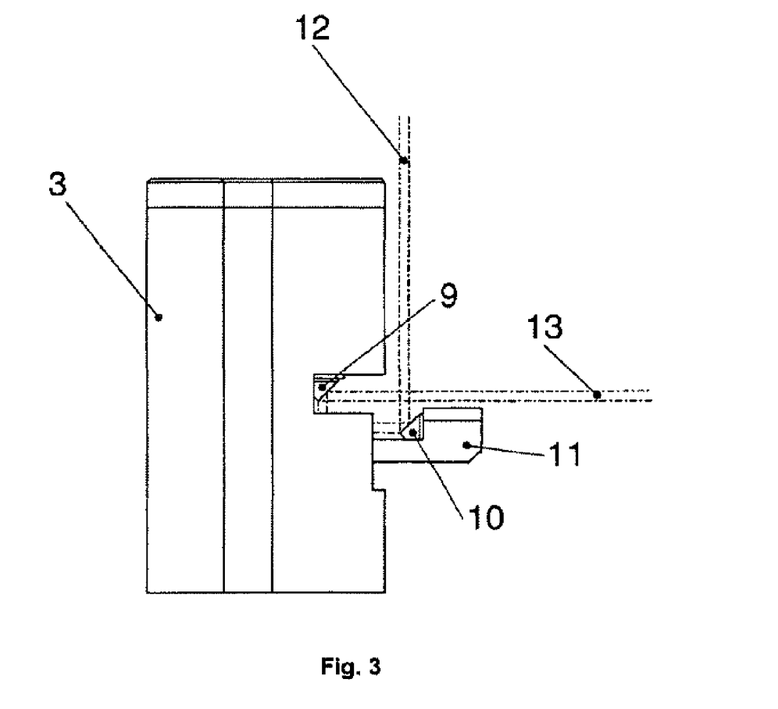
FIG. 3 shows a side view of the self-leveling multi-line laser device—incorporated into a housing—of the embodiment in FIG. 1 with illustrated laser light planes.

The illustrations in FIGS. 1 and 2 show the basic construction of the central optical and mechanical components of one embodiment of the self-leveling multi-line laser device. The latter comprises an optical system carrier 1, which preferably substantially consists of a metallic die-cast alloy (preferably aluminum or zinc die-cast alloy) and carries the essential optical elements, which are explained below. Said optical system carrier 1 is suspended in oscillating fashion in a frame element 2, which is connected to a device housing (illustrated only in FIGS. 3 and 4 with reference symbol 3).

The oscillating suspension of the optical system carrier 1 is effected by means of a universal joint with ball bearings 4, wherein the two mutually perpendicular bearing axes are not arranged in one plane, but rather in a vertically offset fashion, as a result of which only one ball bearing is required per axis of rotation and alignment problems and strains in the bearing axes, such as could occur on account of manufacturing tolerances when using two ball bearings, are avoided. As a result of this construction, the optical system carrier 1 can oscillate freely about two axes and be aligned in Earth's gravitational field.

In order to considerably shorten the settling duration of the optical system carrier 1 suspended in oscillating fashion and—within the scope of what is technically possible—as frictionlessly as possible, without reducing the setting accuracy of the end position of the optical system carrier 1 in the gravitational field, the optical system carrier 1 in the exemplary embodiment illustrated here has an eddy-current damping arrangement according to the principle of Waltenhof's pendulum. For this purpose, a copper block 5 is fitted to the lower, free end of the optical system carrier 1 suspended in oscillating fashion, wherein the copper block 5 moves in the case of an oscillating movement at a small distance contactlessly above a permanent magnet 6, which is fixedly connected to the housing 3. Said permanent magnet 6 advantageously comprises a plurality of individual magnet elements (in this case: four) having preferably an alternating magnetic field orientation and is optimized to the effect that the magnetic field lines pass with a highest possible magnetic field density and greatest possible magnetic field strength gradient through the copper block 5 and generate there, via electromagnetic induction, a magnetic field directed oppositely to the field of the permanent magnet 6; this induced magnetic field greatly damps the oscillating movement of the optical system carrier 1, but without influencing the end position of the optical system carrier 1, since the damping according to the magnetic eddy-current principle is proportional to the speed of the relative movement between permanent magnet 6 and copper block 5 and therefore does not apply in the static case after the damping of the movement of the optical system carrier 1.

In this way, the damping can be optimized and set, for example, virtually to the "aperiodic limiting case". By means of the eddy-current damping arrangement, the optical system carrier 1 is set after the installation of the multi-line laser device or after an impact against the multi-line laser device within a short time of typically from 0.5 to 5 seconds with a high accuracy of e.g. a few tenths of a millimeter per meter in Earth's gravitational field. In order to adjust the precise alignment of the optical system carrier 1 in Earth's magnetic field, the optical system carrier can have, in the vicinity of the copper block, two tare screws (e.g. grub screws; not illustrated), which form angles of preferably 90° with respect to one another and with respect to the centroid line at the optical system carrier 1—and preferably angles of 0° and 90°, respectively, with respect to the alignment of the horizontal laser beam—and by means of the scoop-in depth of which the centroid position of the optical system carrier 1 and, as a result thereof, the exact alignment of the laser lines can be slightly corrected.

Furthermore, the permanent magnet 6, which has a larger diameter than the copper block 5, has at the outer circumference thereof a radial stop (not illustrated) for said copper block 5, as a result of which the oscillating movement of the optical system carrier 1 (and hence the self-leveling range of the self-leveling multi-line laser device) can be delimited for example to a specific value (for example in the range of from 5° to 15°, typically to a maximum of 5° or 8°). It is thereby possible to prevent the optical system carrier or the components connected thereto from striking against the housing 3 and overstretching for example of the (highly flexible and flexurally slack, but extremely thin and tension-sensitive) electrical supply cables (not illustrated) for the laser beam sources 7, 8 for example in the case of very oblique installation of the multi-line laser device, during operation or during transport. On contact between the copper block 5 and the radial stop of the permanent magnet 6, an electrical contact in a monitoring circuit can be closed and the user can thus be warned of an incorrectly leveled system, e.g. by means of a visual or acoustic signal and/or by means of periodic blanking (flashing) of the laser beam sources 7, 8.

In a first exemplary embodiment, illustrated in FIG. 1, the optical construction of the self-leveling multiline laser device has, in principle, a vertical laser beam source 7, which is preferably fitted to the optical system carrier 1 near the centroid line and parallel thereto and directs a laser beam from below against the vertex of a mirror cone (or reflective cone) 9 fitted there above to the optical system carrier 1, as a result of which the laser beam 13 is deflected and expanded in a horizontal partial plane, and also a horizontal laser beam source 8, which is fitted perpendicularly to the centroid line of the optical system carrier 1 and directs a laser beam against the vertex of a minor cone (or reflective cone) 10 fixed on a horizontal cantilever 11, as a result of which the laser beam 12 is deflected and expanded in a vertical partial plane, wherein the partial planes of the two expanded laser beams form exactly an angle of 90° with respect to one another (see FIG. 1, in particular). In this case, the axes of the reflective cones are also perpendicular to one another; moreover, advantageously—as in this exemplary embodiment—the axes of the reflective cones intersect at a point. In another embodiment, the self-leveling multi-line laser device can have a third mirror cone (or reflective cone) 23 for generating a further, vertical, laser line, perpendicular to two other laser lines.

Figure 6:
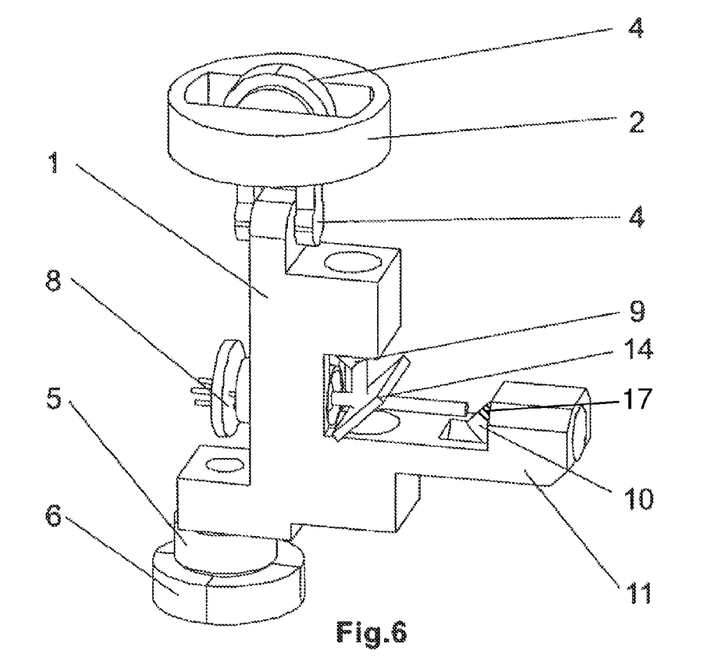
FIG. 6 shows a perspective view of the optical system carrier of a second embodiment of the self-leveling multi-line laser device with incorporated laser modules (comprising, inter alia, laser diode and collimator lenses) and projection cones (reflective cones), and also with cardanic suspension and an eddy-current damping arrangement.

In a second, alternative exemplary embodiment, illustrated in FIG. 6, the self-leveling multi-line laser device has—instead of two laser 5 beam sources 7, 8—only a single laser beam source 8 (here the horizontal laser beam source 8), which emits a horizontal laser beam. Said laser beam impinges on a partly transmissive minor 14, which is arranged at the point of intersection of the axes of the two reflective cones 9, 10 and forms angles of 45° in each case with respect to said axes, wherein the angle bisector between the axes of the two reflective cones 9, 10 and a line perpendicular to the axes of the two reflective cones 9, 10 at the point of intersection of said axes define the plane of the reflective surface of the partly transmissive minor 14. However, it is likewise conceivable to displace the partly transmissive mirror 14 in a parallel fashion relative to the above-described position, in order thereby to configure the illumination geometry of the reflective cones 9, 10 differently and thus to influence the orientation and angular range of the expanded laser line. As a result of this arrangement of the partly transmissive mirror 14, the laser beam of the horizontal laser beam source is split into two mutually perpendicular partial laser beams—a horizontal, non-deflected partial laser beam and a vertical partial laser beam reflected at the partly transmissive minor 14—directed parallel to the axis of in each case one of the two reflective cones against the vertex of said reflective cone 9, 10, as a result of which in turn two projectable laser lines 12, 13 can be generated.

Figure 7:
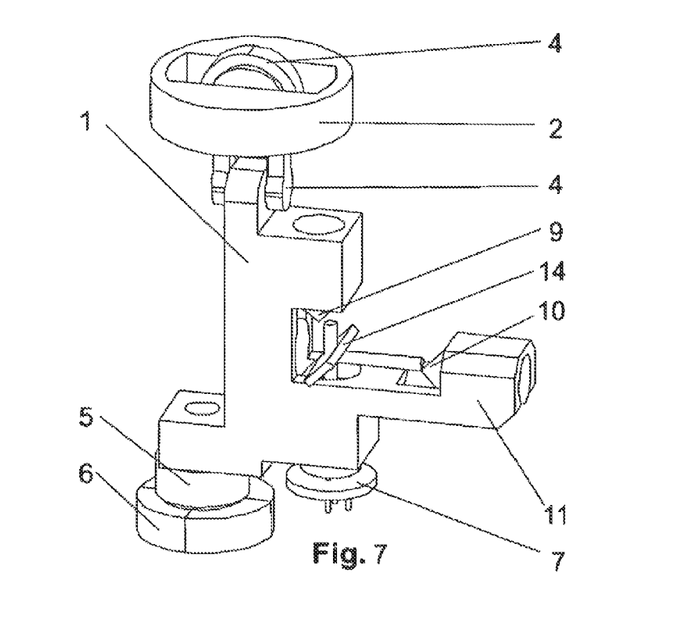
FIG. 7 shows a perspective view of the optical system carrier of a third embodiment of the self-leveling multi-line laser device with incorporated laser modules (comprising, inter alia, laser diode and collimator lenses) and projection cones (reflective cones), and also with cardanic suspension and an eddy-current damping arrangement.

In the same way it is possible to operate the self-leveling multi-line laser device in a different embodiment, illustrated in FIG. 7, only with a vertical laser beam source 7 and to split the vertical laser beam generated thereby, by means of a partly transmissive mirror 14, into two partial laser beams—a vertical, non-deflected partial laser beam and a horizontal partial laser beam reflected at the partly transmissive mirror 14—directed parallel to the axis of in each case one of the two reflective cones against the vertex of said reflective cone 9, 10, as a result of which likewise two projectable laser lines 12, 13 can be generated.

The laser beam sources 7, 8 used are inexpensive "low-power" laser diodes that generate elliptically divergent light cones inherently, i.e. on account of the physical origination principle. Said light cones are directed in a parallel manner by means of collimator lenses 18. Since the alignment between laser diode and collimator lens 18 is accorded significant importance, it is advantageous from standpoints of production engineering and costs to combine laser diode and collimator lens to form a laser module 7, 8 as an assembly, which already emit a parallel-directed, elliptical beam bundle, and thus to incorporate them—as a prefabricated laser module 7, 8—into the optical system carrier 1.

These elliptical parallel beams of a laser module 7, 8 are directed excentrically in the axial direction against the vertex of one of the mirror cones 9, 10, which has the form of a right circular cone having an aperture angle of 90° (i.e. the center axis of the laser beam has a parallel offset relative to the cone axis), wherein chiefly one cone half (of those arising in the case of a conic section that contains the cone axis, that is to say is symmetrical) is illuminated. By virtue of the reflectively coated lateral surface of the reflective cone that is inclined at an angle of 45° with respect to the laser beam, the laser beam is deflected by reflection on the illuminated cone half at an angle of 90° and thus generates—instead of a full circle plane such as would arise in the case of central illumination of the cone on account of the rotational symmetry of the cone—approximately a 180° laser line or half-plane. In this case, the mirror cones are each mounted in such a way that at least the illuminated cone portion is situated freely and the emission of the laser light in the emission plane is not impeded.

Figure 5:
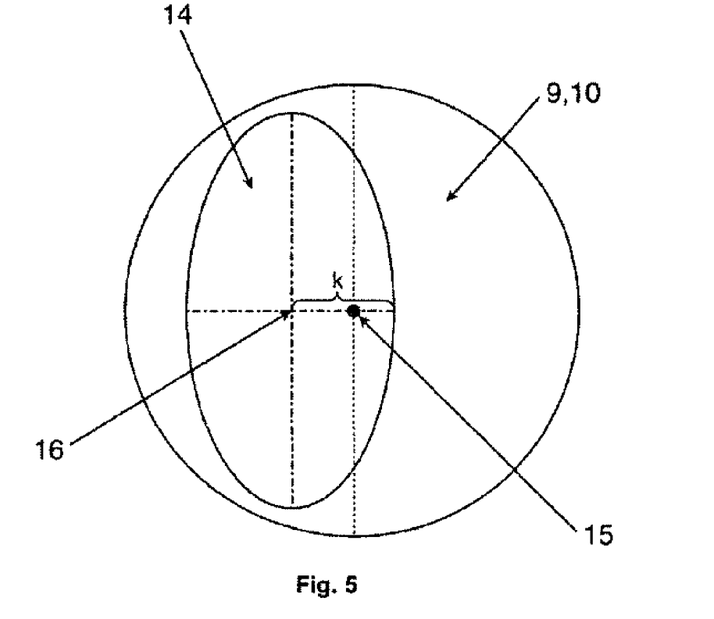
FIG. 5 shows a schematic illustration of the beam position of the elliptical laser beam from the projection cone (reflective cone)

Preferably, but not—as described above—exclusively, one cone half is illuminated with the laser beam. The collimated laser light of the laser diode generates, as already mentioned, a laser beam having an elliptical beam cross section 14. As can be seen from FIG. 5, this laser beam is then preferably directed against the vertex 15 of the mirror cone 9, 10 in such a way that although the center axis 16 of the elliptical laser beam is aligned parallel to the cone axis, it does not coincide with the latter (that is to say illuminates the cone 9, 10 excentrically), the cone axis 15 therefore intersecting the short semiaxis k of the elliptical beam cross section 14. In this case, the center axis of the elliptical beam cross section 14 has a parallel offset relative to the cone axis 15 and is spaced apart from the cone axis 15 in the direction of the short semiaxes k, of the elliptical beam cross section 14, wherein this distance between the center axis 16 of the elliptical beam cross section 14 and the cone axis 15 in this exemplary embodiment is at least somewhat smaller than the length of the short semiaxes k of the elliptical beam cross section 14. This ensures that one cone half is illuminated with the main part of the laser energy and thus generates a particularly bright and uniform projectable laser line 12, 13, while the other cone half is illuminated only to a lesser extent. However, since a smaller proportion of the laser beam reaches across onto this other cone half, it is possible to generate a projectable laser line 12, 13 which extends over an angular range of more than 180° and still has a useable brightness in the 180° position. The offset can be optimized in such a manner that the projectable laser line 12, 13 has a high and largely uniform brightness distribution over an angular range of more than 180°, wherein the ellipticity of the laser beams emitted by the laser diodes can advantageously be utilized. The large angular range of more than 180° covered by the laser line 12, 13 makes it possible to expand the two laser beams in a plane to such a great extent that they generate two intersection points (or marking crosses) of the laser lines in the "180° position" with respect to one another for example on walls lying opposite one another (see FIG. 4).

In principle, there is a relationship between the power of the laser diode of a specific design and the ellipticity of the emitted laser beam 14; thus, in particular, laser beams from laser diodes with low power have particularly highly oblate-elliptical beam cross sections. It may therefore be advantageous, particularly in the case of such laser diodes, to mask the beam slightly in the marginal regions, such that, for example, the outermost marginal regions are trimmed in the direction of the long semiaxis and a beam cross-section that is less highly elliptical thus arises. As a result, by way of example, it is possible to balance the brightness distribution of the projectable laser line 12, 13 for example over an angular range of 180° even better and, in addition, to prevent marginal regions of the elliptical laser beam 14 from passing the reflective cone without being reflected, and from producing disturbing reflections and light figures or from bringing about dangerous dazzling of persons. Such a masking could be performed, for example, by means of an elliptical diaphragm 19, a diaphragm in the shape of a circle sector, or a diaphragm shaped in some other way, which is arranged in the beam path of the laser diode upstream or downstream of the collimator lens. The shape of such a diaphragm 19 can also be adapted in a manner and optimized to an effect such that the brightness distribution of the laser line 12, 13 over the desired angular range (for example 180°) is virtually completely balanced, in which case such a diaphragm 19 would only have to mask relatively small marginal regions of the laser beam and would thus reduce the useable power of the laser diode only to a small extent.

The device housing 3 (see FIG. 4) preferably substantially consists of a polymeric material or a for example fiber-armored polymer composite material (e.g. fiber-reinforced thermosetting plastic or thermoplastic). The device housing 3 surrounds the above-described mechanical and optical arrangement and protects the latter against mechanical damage and reduces the risk of contaminants (see FIG. 3). The device housing 3 has an opening, through which the horizontal laser beam 13 can emerge and the horizontal cantilever 11 of the optical system carrier 1 projects toward the outside, such that the latter does not impair the mobility of the optical system carrier 1 and the cone 10 fixed to the horizontal cantilever can be positioned outside the housing.

Alternatively, an optical neutral protective dome composed of transparent, impact-resistant plastic, for example, that does not distort the beam path of the fanned-out laser beams can also be provided above the open housing portion.

Furthermore, in the exemplary embodiment illustrated here, the housing 3 also accommodates two batteries or rechargeable batteries for power supply (not illustrated), actuating elements (not illustrated), preferably membrane switches for the joint and separate switching of the two laser beam sources, and also an electronic circuit (not illustrated), for the operation of the laser beam sources. The power supply of the laser beam sources from the electronic circuit mounted in the housing 3 to the laser diodes 7 suspended in oscillating fashion in the optical system carrier 1 is effected by means of very thin, highly flexible and flexurally slack electrical supply cables (not illustrated), that are led closely past the suspension point of the optical system carrier 1, in order to impair the oscillation of the optical system carrier 1 in the gravitational field and the leveling accuracy as little as possible.

The disclosure is not limited by concrete embodiments, and features of different embodiments can be combined freely with one another. Terms in the application which describe the position of different components with respect to one another, such as "exactly 90°" or "perpendicular to one another", "on a line", "within the optical plane" or the like can describe the desired ideal position/situation and include the fact that, on account of the mechanical/optical configuration, certain deviations and inaccuracies can arise which are concomitantly encompassed by the teaching. In the case of range indications, not only the end values indicated but also all values in-between and partial ranges contained therein are concomitantly encompassed by the teaching. Insofar as this application talks of a laser line or projectable laser line, this is taken to mean the geometrical figure that arises when the laser beam expanded by the reflection at the cone in a plane is incident on a planar object and generates a laser light line there in the projection.

The invention claimed is:

1. A self-leveling multi-line laser device comprising:
at least two laser beams being generated by at least one laser beam source; and
at least two reflective cones,
wherein the cone axes of the reflective cones are perpendicular to one another and each of the laser beams is configured to be directed parallel to the axis of one of the reflective cones against the vertex of said reflective cone, as a result of which at least two projectable laser lines are generated,
wherein at least one of the at least two laser beams includes an elliptical beam cross section,
wherein the center axis of the elliptical beam cross section has a parallel offset relative to the cone axis and is spaced apart from the cone axis in the direction of the short semiaxes of the elliptical beam cross section and the elliptical beam cross section is directed against the cone axis.

2. The self-leveling multi-line laser device as claimed in claim 1, wherein the reflective cones have at least partial areas of a lateral surface of a right circular cone having a cone aperture angle of 90°.

3. The self-leveling multi-line laser device as claimed in claim 1, wherein at least one of the reflective cones has non-reflective partial areas.

4. The self-leveling multi-line laser device as claimed in claim 3, further comprising a diaphragm arranged in the beam path of the laser diode.

5. The self-leveling multi-line laser device as claimed in claim 1, wherein at least one laser beam of the at least two laser beams is generated by a laser diode as the laser beam source and is configured to be collimated by at least one collimating optical element.

6. The self-leveling multi-line laser device as claimed in claim 5, wherein an optical system carrier, on and/or in which the at least one laser beam source, the at least one collimating optical element and the at least two reflective cones are mounted, is alignable in a gravitational field, as a result of which the laser beams and cone axes are alignable in the direction of the gravitational vector or perpendicularly thereto.

7. The self-leveling multi-line laser device as claimed in claim 6, wherein the optical system carrier has a vibration damping arrangement.

8. The self-leveling multi-line laser device as claimed in claim 7, wherein the vibration damping arrangement includes a magnetic damping arrangement.

9. The self-leveling multi-line laser device as claimed in claim 8, wherein the magnetic damping arrangement includes an eddy-current damping arrangement.

10. The self-leveling multi-line laser device as claimed in claim 5, wherein the at least one laser beam source, the at least one collimating optical element and the at least two reflective cones are mounted on and/or in an optical system carrier, wherein the optical system carrier is embodied in self-leveling fashion and is suspended in oscillating fashion on two mutually perpendicular bearing axes aligned substantially horizontally in an operating state.

11. The self-leveling multi-line laser device as claimed in claim 5, wherein the at least one collimating optical element is a collimator lens.

12. The self-leveling multi-line laser device as claimed in claim 1, wherein the distance between the center axis of the elliptical beam cross section and the cone axis is less than the length of the short semiaxes of the elliptical beam cross section.

13. The self-leveling multi-line laser device as claimed in claim 1, wherein the at least two laser beams are coupled out from the at least one laser beam source by beam splitting by a partly reflective optical element.

14. The self-leveling multi-line laser device as claimed in claim 13, wherein the partly transmissive optical element is a partly transmissive minor, wherein the partly transmissive mirror in each case forms angles of 45° with the axes of the reflective cones and is arranged at the point of intersection of the axes of the two reflective cones.

15. The self-leveling multi-line laser device as claimed in claim 1, further comprising a beam splitter, which in each case forms angles at 45° with the axes of the reflective cones and is arranged at the point of intersection of the axes of the two reflective cones, wherein the at least two laser beams are a result of being split from a single laser beam into two mutually perpendicular partial laser beams.

16. The self-leveling multi-line laser device as claimed in claim 1, wherein the useable angular range of the laser line emitted from at least one of the reflective cones is at least 180° in the horizontal plane and greater than 240° in the vertical plane.

17. The self-leveling multi-line laser device as claimed in claim 16, wherein the useable angular range of the laser line emitted from the reflective cone is greater than 200° in the horizontal plane and greater than 240° in the vertical plane.

18. The self-leveling multi-line laser device as claimed in claim 1, wherein the self-leveling multi-line laser device has a third reflective cone for generating a further, vertical, laser line, perpendicular to two other laser lines.

19. A self-leveling multi-line laser device comprising:
at least two laser beams being generated by at least one laser beam source;
and at least two reflective cones,
wherein the cone axes of the reflective cones are perpendicular to one another and each of the laser beams is configured to be directed parallel to the axis of one of the reflective cones against the vertex of said reflective cone, as a result of which at least two projectable laser lines are generated,
wherein at least one of the at least two laser beams includes an elliptical beam cross section wherein the center axis of the elliptical beam cross section has a parallel offset relative to the cone axis and is spaced apart from the cone axis in the direction of the short semiaxes of the elliptical beam cross section, and the distance between the center axis of the elliptical beam cross section and the cone axis is less than or equal to the length of the short semiaxes of the elliptical beam cross section.

* * * * *

UNITED STATES PATENT AND TRADEMARK OFFICE
CERTIFICATE OF CORRECTION

| | |
|---|---|
| PATENT NO. | : 8,813,379 B2 |
| APPLICATION NO. | : 13/260449 |
| DATED | : August 26, 2014 |
| INVENTOR(S) | : Thomas Zimmermann |

It is certified that error appears in the above-identified patent and that said Letters Patent is hereby corrected as shown below:

In the Claims,

In column 10, lines 30-35, claim 14 should recite:

> 14. The self-leveling multi-line laser device as claimed in claim 13, wherein the partly transmissive optical element is a partly transmissive mirror, wherein the partly transmissive mirror in each case forms angles of 45° with the axes of the reflective cones and is arranged at the point of intersection of the axes of the two reflective cones.

Signed and Sealed this
Thirteenth Day of January, 2015

Michelle K. Lee
*Deputy Director of the United States Patent and Trademark Office*